US008442768B2

(12) United States Patent
Sasaki

(10) Patent No.: US 8,442,768 B2
(45) Date of Patent: May 14, 2013

(54) NAVIGATION SYSTEM, PORTABLE TERMINAL DEVICE, AND IN-VEHICLE DEVICE

(75) Inventor: Mitsuru Sasaki, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 445 days.

(21) Appl. No.: 12/738,893

(22) PCT Filed: Oct. 22, 2008

(86) PCT No.: PCT/JP2008/069141
§ 371 (c)(1),
(2), (4) Date: Apr. 20, 2010

(87) PCT Pub. No.: WO2009/054409
PCT Pub. Date: Apr. 30, 2009

(65) Prior Publication Data
US 2010/0223006 A1    Sep. 2, 2010

(30) Foreign Application Priority Data
Oct. 22, 2007   (JP) .................................. 2007-274222

(51) Int. Cl.
*G01C 21/34*   (2006.01)
*G01C 21/30*   (2006.01)
*G01C 21/32*   (2006.01)
*G08G 1/123*   (2006.01)

(52) U.S. Cl.
USPC ....... 701/533; 701/425; 340/990; 340/995.12

(58) Field of Classification Search .......... 701/400–533; 340/988–996; 455/456.1–457
See application file for complete search history.

(56) References Cited

U.S. PATENT DOCUMENTS

| 5,712,899 | A | * | 1/1998 | Pace, II ....................... 455/456.2 |
| 5,732,385 | A | * | 3/1998 | Nakayama et al. ............ 701/437 |
| 5,936,631 | A | * | 8/1999 | Yano et al. ..................... 345/428 |
| 6,064,941 | A | * | 5/2000 | Nimura et al. ................. 701/416 |
| 6,075,467 | A | * | 6/2000 | Ninagawa ................. 340/995.14 |
| 6,324,469 | B1 | * | 11/2001 | Okude et al. .................. 701/532 |
| 7,212,920 | B1 | * | 5/2007 | Bailey et ....................... 701/457 |

(Continued)

FOREIGN PATENT DOCUMENTS

| JP | 5-345550 | 12/1993 |
| JP | 7-218279 | 8/1995 |

(Continued)

OTHER PUBLICATIONS

"Introducing the Parrot Bluetooth Car Kit", RevoZport racing technology ltd., 2006.*

(Continued)

*Primary Examiner* — Khoi Tran
*Assistant Examiner* — Abby Lin
(74) *Attorney, Agent, or Firm* — Wenderoth, Lind & Ponack, LLP

(57) ABSTRACT

A navigation system is configured such that: an in-vehicle device collects and provides position information and movement information of a vehicle to a portable terminal device, and displays image data sent from the portable terminal device. The portable terminal device acquires map information from a map center device based on the position information and the movement information sent from the in-vehicle device, calculates an actual location of the vehicle based on the position information and the movement information sent from the in-vehicle device, and generates image data in which the calculated actual location is superposed on the acquired map information.

9 Claims, 6 Drawing Sheets

U.S. PATENT DOCUMENTS

| | | | |
|---|---|---|---|
| 7,243,134 B2 * | 7/2007 | Bruner et al. | 709/216 |
| 2002/0026289 A1 * | 2/2002 | Kuzunuki et al. | 702/150 |
| 2002/0077745 A1 * | 6/2002 | Ohmura et al. | 701/208 |
| 2003/0045997 A1 | 3/2003 | Nakane et al. | |
| 2003/0164778 A1 * | 9/2003 | Muramatsu | 340/988 |
| 2003/0193390 A1 * | 10/2003 | Muramatsu | 340/426.13 |
| 2004/0034468 A1 * | 2/2004 | Kobayashi et al. | 701/205 |
| 2004/0203918 A1 * | 10/2004 | Moriguchi et al. | 455/456.1 |
| 2004/0204840 A1 * | 10/2004 | Hashima et al. | 701/209 |
| 2004/0225436 A1 * | 11/2004 | Yoshihashi | 701/208 |
| 2005/0222933 A1 * | 10/2005 | Wesby | 705/36 |
| 2007/0109185 A1 * | 5/2007 | Kracke et al. | 342/357.09 |
| 2007/0198148 A1 * | 8/2007 | Namaky | 701/29 |
| 2007/0220562 A1 * | 9/2007 | Janssen et al. | 725/81 |
| 2010/0094533 A1 * | 4/2010 | Wu | 701/200 |

FOREIGN PATENT DOCUMENTS

| | | |
|---|---|---|
| JP | 2002-5670 | 1/2002 |
| JP | 2002-48560 | 2/2002 |
| JP | 2002-109690 | 4/2002 |
| JP | 2002-213990 | 7/2002 |
| JP | 2003-75177 | 3/2003 |
| JP | 2004-340633 | 12/2004 |
| JP | 2004-354268 | 12/2004 |
| JP | 2005-181262 | 7/2005 |
| JP | 2007-85950 | 4/2007 |
| JP | 2007-195144 | 8/2007 |

OTHER PUBLICATIONS

"Garmin nuvi 680 Review", GPSmagazine.com, Feb. 76, 2007.*

Japanese Official Action (with English translation) issued May 29, 2012 in corresponding Japanese Patent Application No. 2007-274222.

International Search Report issued Nov. 25, 2008 in International (PCT) Application No. PCT/JP2008/069141.

* cited by examiner

| SPEED RANGE | SCALE SIZE |
|---|---|
| 0 km TO 20 km | 1/10000 |
| 20 km TO 40 km | 1/20000 |
| ⋮ | ⋮ |

FIG.5
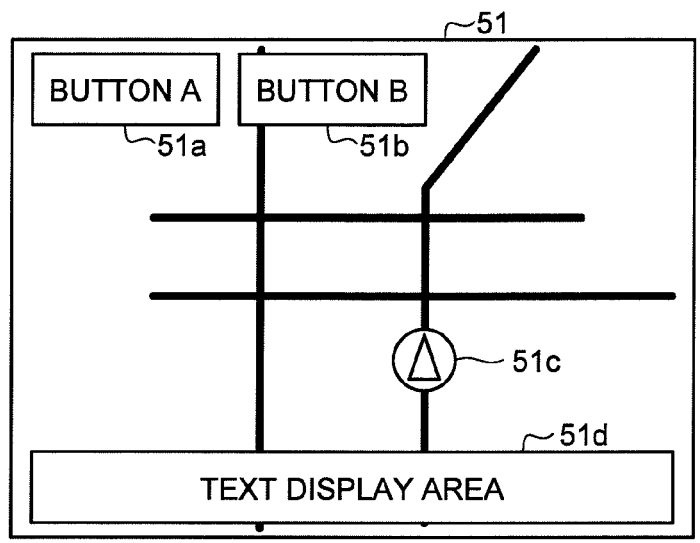
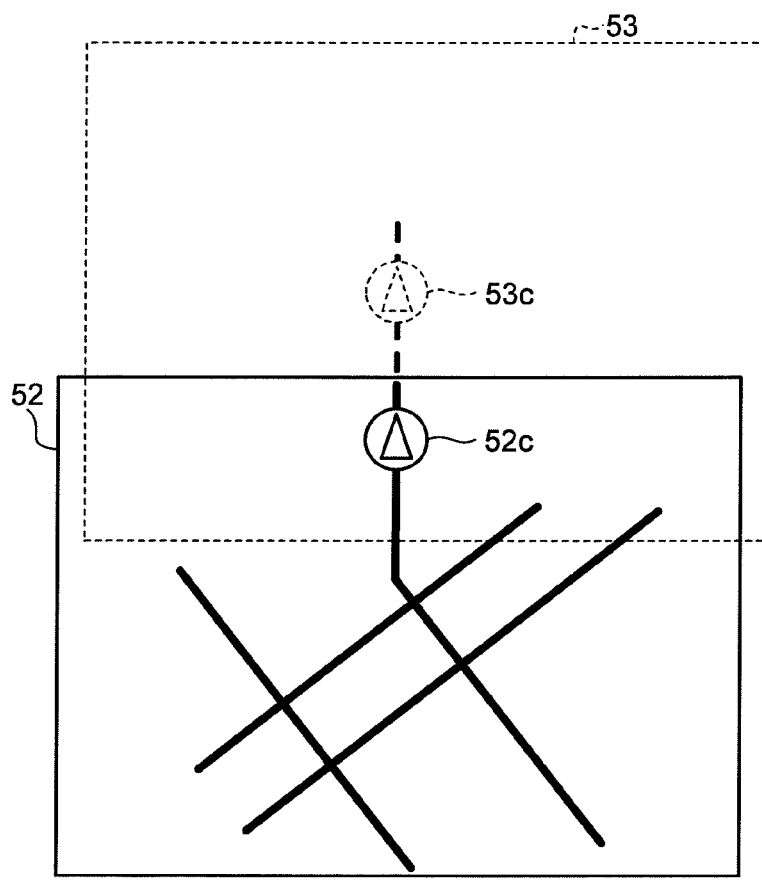

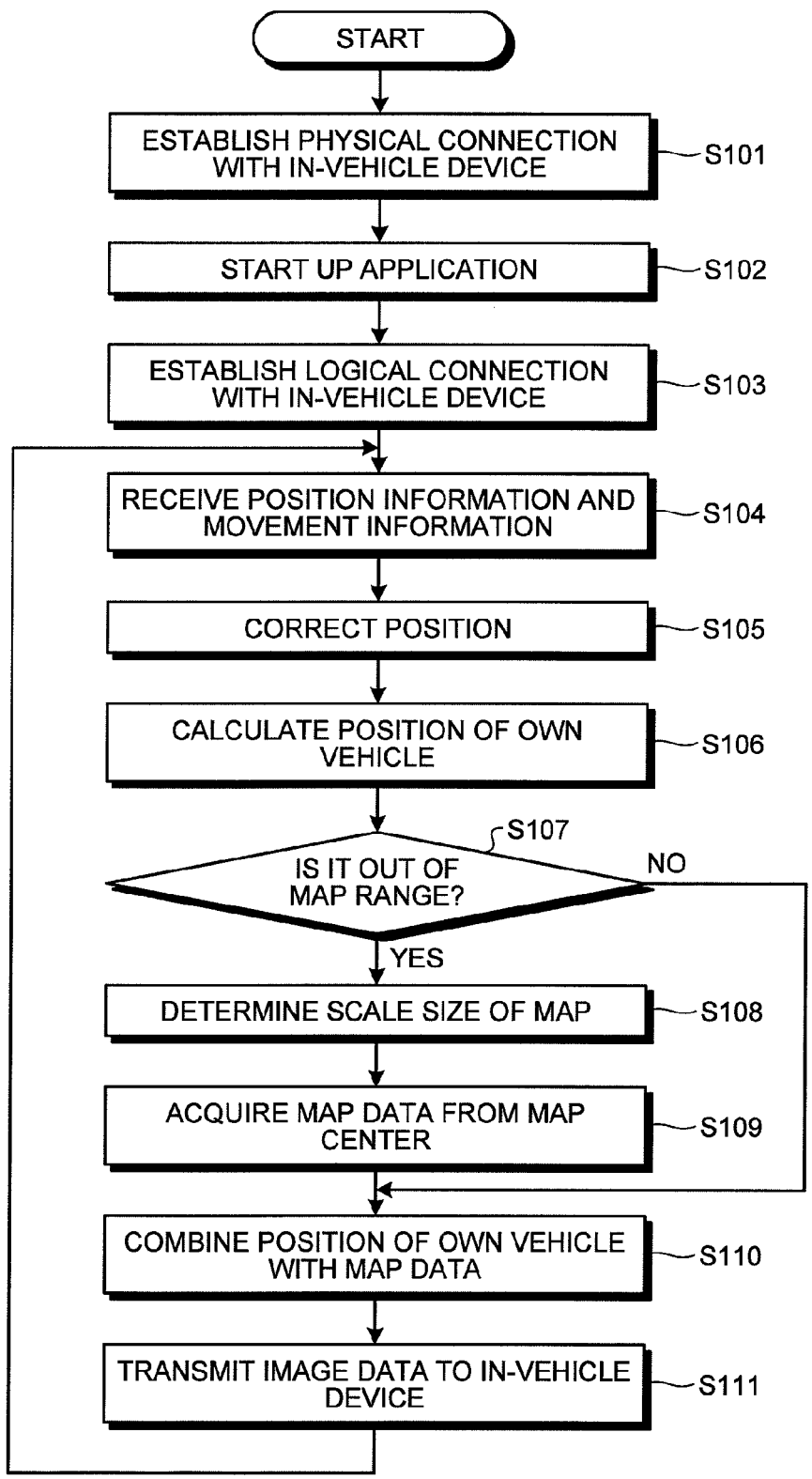

NAVIGATION SYSTEM, PORTABLE TERMINAL DEVICE, AND IN-VEHICLE DEVICE

BACKGROUND OF THE INVENTION

1. Technical Field

The present invention relates to a navigation system which provides route information including information on an actual location of a vehicle using an in-vehicle device mounted on the vehicle and a portable terminal device carried by a passenger, the portable terminal device, and the in-vehicle device, and more particularly to a navigation system, a portable terminal device, and an in-vehicle device which can realize highly-precise navigation while preventing duplication in resources.

2. Description of the Related Art

Known car navigation systems calculate an actual location of a car using a Global Positioning System (GPS), a gyro, a vehicle-speed sensor, and the like, and combines and displays the actual location of the vehicle with map information of surrounding roads and buildings on a display.

In addition, as the performances of portable terminal devices such as portable telephones and personal digital assistants (PDA) is enhanced, navigation systems using GPS come to be implemented in the portable terminal devices.

Some have tried to construct a car navigation system by connecting the portable terminal device equipped with a navigation function to an in-vehicle device. For example, Japanese Patent Application No. 2002-48560 discloses a technology for acquiring map data via a portable telephone to use the map data for car navigation. Further, Japanese Application No. 2005-181262 discloses a technology for realizing navigation by connecting a portable telephone with a navigation function to a vehicle with no navigation function.

SUMMARY OF THE INVENTION

1. Problem to be Solved by the Invention

However, when technology as described in JP 2002-48560 or JP 2005-181262 is used in implementing a car navigation system, problems arise because of a specific characteristic of the navigation function of a portable terminal device.

Specifically, the navigation function of portable terminal devices such as portable telephones is designed based on a speed of human movement. Hence, these devices cannot update maps in accordance with the running speed of a vehicle. Further, the navigation function of portable terminal devices is normally designed to calculate an actual location based only on GPS function without using movement information obtained by, for example, a vehicle-speed sensor. Hence, the portable terminal devices cannot perform map matching and would display the actual location of a vehicle outside road area.

When a navigation system is implemented by coordination between an in-vehicle device mounted on a vehicle and a portable terminal device carried by a passenger, each of the in-vehicle device and the portable terminal device may have the same function, which may result in an expensive navigation system.

Thus, a question in implementing a navigation system via coordination of the in-vehicle device on the vehicle and the portable terminal device carried by a passenger, is how to realize highly precise navigation while preventing duplication of resources.

The present invention is made to solve the problems of conventional technologies as described above, and an object of the present invention is to provide a navigation system, portable terminal device, and in-vehicle device which allow highly precise navigation while preventing duplication of resources.

2. Means for Solving the Problems

According to one aspect of the present invention, a navigation system for providing route information including an actual location of a vehicle includes an in-vehicle device mounted on the vehicle and a portable terminal device carried by a passenger, and wherein the in-vehicle device includes a vehicle-information providing unit that collects and provides position information and movement information of the vehicle to the portable terminal device, and a display unit that displays image data sent from the portable terminal device, and the portable terminal device includes a map-information acquiring unit that acquires map information from a map center device based on the position information and the movement information received from the vehicle-information providing unit of the in-vehicle device, an actual-location calculating unit that calculates the actual location of the vehicle based on the position information and the movement information received from the vehicle-information providing unit of the in-vehicle device, and an image-data generating unit that generates the image data in which the actual location calculated by the actual-location calculating unit is superposed on the map information acquired by the map-information acquiring unit.

According to another aspect of the present invention, a portable terminal device for providing route information including actual location of a vehicle in cooperation with an in-vehicle device mounted on the vehicle includes a map-information acquiring unit that acquires map information from a map center device based on position information and movement information of the vehicle collected by the in-vehicle device, an actual-location calculating unit that calculates an actual location of the vehicle based on the position information and the movement information collected by the in-vehicle device, an image-data generating unit that generates image data by superposing the actual location calculated by the actual-location calculating unit on the map information acquired by the map-information acquiring unit, and an image-data providing unit that provides the image data generated by the image-data generating unit to the in-vehicle device.

According to still another aspect of the present invention, an in-vehicle device for providing route information including an actual location of a vehicle in cooperation with a portable terminal device carried by a passenger includes a vehicle-information providing unit that collects and provides position information and movement information of the vehicle to the portable terminal device; and a display unit that displays image data sent from the portable terminal device.

3. Effect of the Invention

According to the embodiment of the present invention, the in-vehicle device collects and provides the position information and the movement information of the vehicle to the portable terminal device, and displays image data sent from the portable terminal device, and the portable terminal device acquires map information from the map center device based on the position information and the movement information sent from the in-vehicle device, calculates the actual location of the vehicle based on the position information and the movement information sent from the in-vehicle device, and generates image data in which the calculated actual location is superposed on the acquired map information. Thus, the in-vehicle-device side only performs provision of position information and the like and the display of a navigation screen, whereas the portable-terminal-device side performs acquisition of map data, calculation of actual location, and generation of the navigation screen. Hence, the duplication of resources can be prevented and highly accurate navigation can be realized.

Further, according to the embodiment of the present invention: the map information is acquired from the map center device based on the position information and the movement information of the vehicle collected by the in-vehicle device; the actual location of the vehicle is calculated based on the position information and the movement information collected by the in-vehicle device; image data in which the calculated actual location is superposed on the acquired map information is generated; and the generated image data is provided to the in-vehicle device. Thus, information such as the position information, the movement information, and the map information is received from outside, and the navigation screen is generated. Hence, without being affected by the limitation in size of the portable terminal device, highly accurate navigation can be realized.

Still further, according to the embodiment of the present invention: the position information and the movement information of the vehicle are collected and provided to the portable terminal device, and the image data sent from the portable terminal device is displayed. Thus, processing of image and other processing such as calculation of an actual location are eliminated at the side of the in-vehicle device. Hence, the in-vehicle device can be manufactured at a low cost.

BRIEF DESCRIPTION OF THE DRAWINGS

FIG. 5 is a view of an example of image data; and

FIG. 6 is a flowchart of a process flow of a portable terminal device.

EXPLANATIONS OF LETTERS OR NUMERALS

Figure 1:
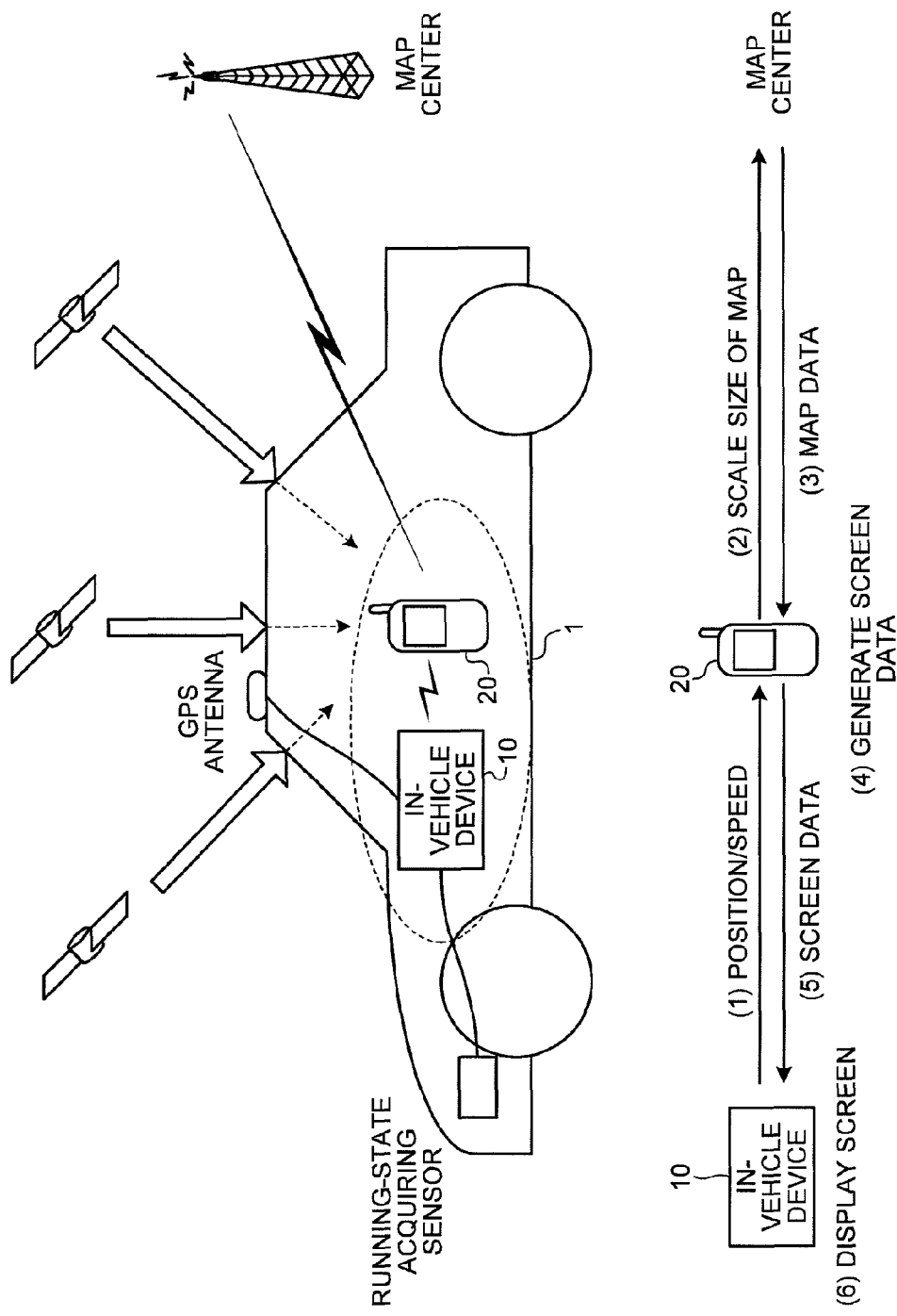
FIG. 1 is a diagram illustrating a feature of a navigation system according to an embodiment.

1 Navigation system
10 In-vehicle device
11 Display
12 Communication unit
13 Control unit
13a Position-information acquiring unit
13b Movement-information acquiring unit
13c Vehicle-outside-information acquiring unit
13d Transmission processing unit
13e Reception processing unit
14 Storage unit
14a Position information
14b Movement information
14c Vehicle-outside information
20 Portable terminal device
21 Antenna
22 Communication unit
23 Control unit
23a Setting unit
23b Scale-size determining unit
23c Map-information acquiring unit
23d Actual-location calculating unit
23e Image data generating unit
23f Transmission processing unit
23g Reception processing unit
24 Storage unit
24a Scale-size information
24b Received information
51a, 51b Operation button
51c Own-vehicle location icon
51d Character display area

DETAILED DESCRIPTION OF THE INVENTION

Exemplary embodiments of a navigation system according to the present invention are described in detail below with reference to accompanying drawings. Hereinbelow, a car navigation system including an in-vehicle device mounted on an automobile and a portable terminal device carried by a passenger is explained. The car navigation system, however, may be applied to other mobile objects such as electric trains and ships. In the following embodiments, a portable telephone is employed as the portable terminal device. Instead, other portable terminal devices such as personal digital assistants (PDAs) and notebook-size personal computers may be employed as the portable terminal device.

Embodiment

FIG. 1 is a diagram illustrating a feature of a navigation system according to an embodiment. As illustrated in FIG. 1, a navigation system 1 according to the embodiment includes: an in-vehicle device 10 connected to a Global Positioning System (GPS) antenna (and GPS positioning system) and a running-state acquiring sensor (i.e., sensors such as a vehicle-speed sensor, rudder-angle sensor, and yaw-rate sensor); and a portable terminal device 20. The portable terminal device 20 acquires a map for navigation from an external map center (a center run by a provider, for example).

As illustrated in FIG. 1, it is necessary to receive radio waves from more than one GPS satellite and calculate the location of a reception point for performing a GPS-based positioning. However, it is difficult to maintain a favorable reception state of a portable telephone having a GPS function when the portable telephone is used inside the vehicle, because the vehicle itself serves to block the radio waves. Therefore, re-reception process of the radio waves from the GPS satellites is required, and the calculated location is updated at long intervals. Thus, the speed of the location calculation does not come up with the running speed of the vehicle.

In addition, when the portable telephone with the GPS function is employed, there is no means for correcting the result of GPS-based positioning. Specifically, commonly-used car navigation systems correct the result of GPS-based positioning using an output value of various types of running-state acquiring sensors (such as a vehicle-speed sensor, rudder-angle sensor, and yaw-rate sensor). When no correction is performed, the calculated location of a vehicle might be outside the road, or becomes inaccurate in a tunnel, for example.

The commercial car navigation system is becoming more multi-functional and more complicated. As a result, the car navigation system tends to be expensive. On the other hand, the use of conventional portable telephones with the GPS function in the car navigation system is accompanied with problems in accuracy of navigation as mentioned above.

In the navigation system 1 according to the embodiment: the in-vehicle device 10 provides to the portable terminal device 20, position information including the result of GPS-based positioning and movement information, such as vehicle speed, indicating the running state (see (1) of FIG. 1); the portable terminal device 20 determines, based on received information, a scale size of map data to be requested to the map center (see (2) of FIG. 1), acquires the map data from the map center (see (3) of FIG. 1), combines the calculated location of the vehicle with the map data (see (4) of FIG. 1), and transmits the result to the in-vehicle device 10 (see (5) of FIG. 1). The in-vehicle device 10 displays screen data sent from the portable terminal device 20 on a display not shown in the drawings (see (6) of FIG. 1).

The in-vehicle device 10 provides position information and movement information, and displays a screen. On the other hand, the portable terminal device 20 calculates the location of the vehicle, acquires map data, and generates screen data for navigation. Thus, the navigation system 1 can be provided at low cost while maintaining an accuracy of navigation and preventing the duplication of resources.

Figure 2:
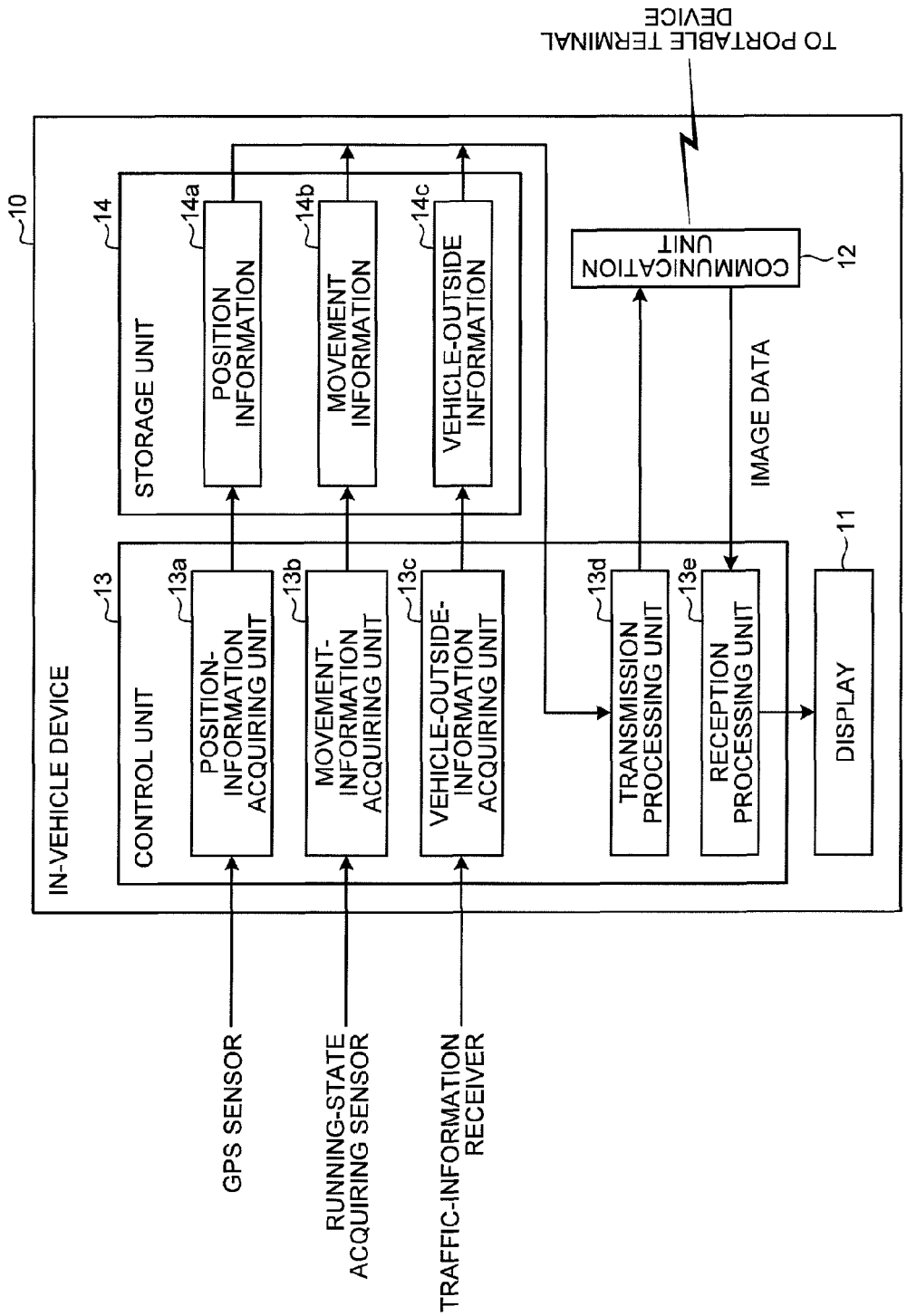
FIG. 2 is a diagram illustrating a configuration of an in-vehicle device.
Figure 3:
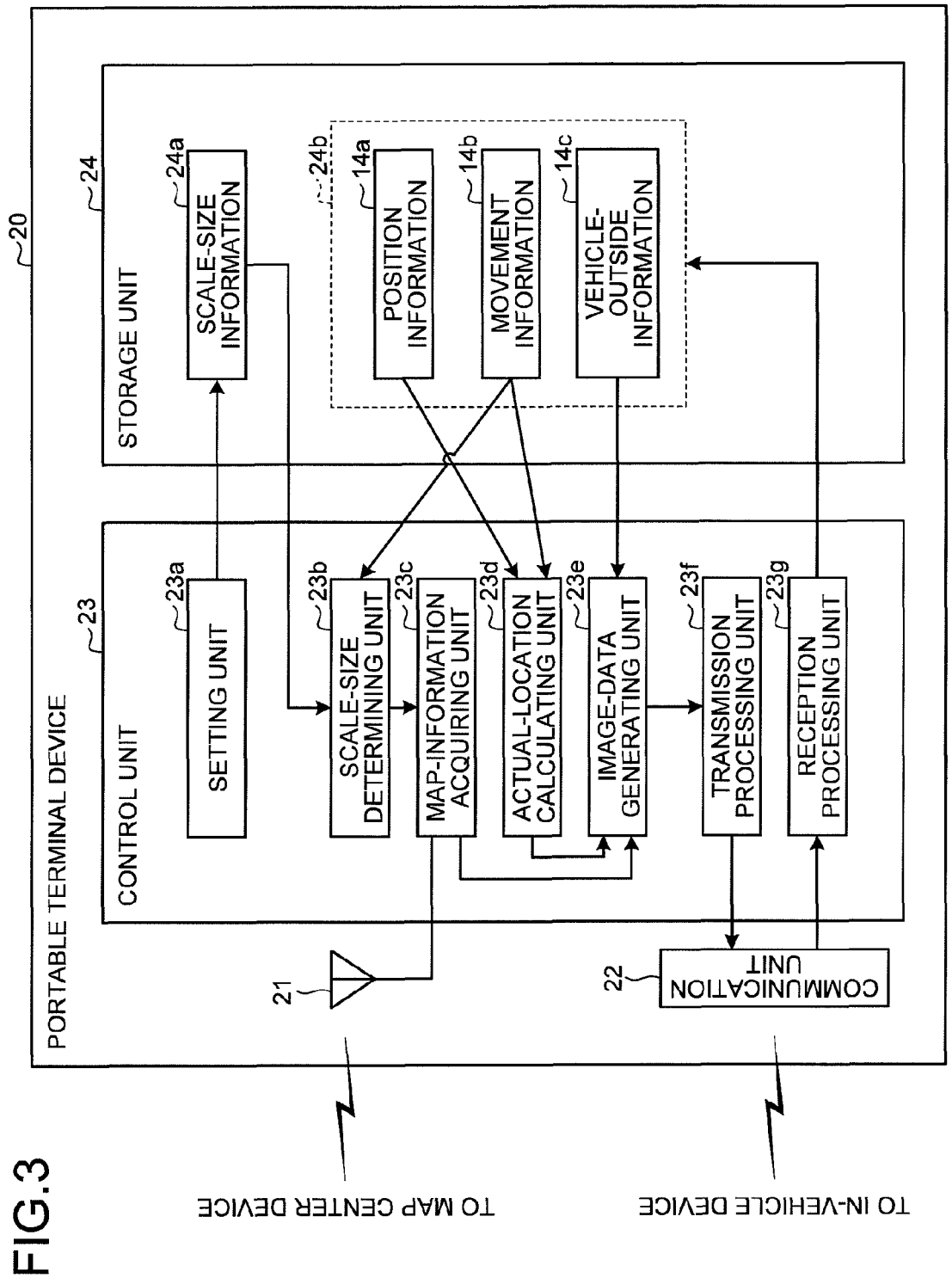
FIG. 3 is a diagram illustrating a configuration of a portable terminal device.

The configurations of the in-vehicle device 10 and the portable terminal device 20 as illustrated in FIG. 1 are explained with reference to FIGS. 2 and 3. FIG. 2 is a diagram of a configuration of the in-vehicle device 10, and FIG. 3 is a diagram of a configuration of the portable terminal device 20. In FIGS. 2 and 3, only main constituent elements are illustrated for explaining the feature of the navigation system 1 according to the embodiment.

As illustrated in FIG. 2, the in-vehicle device 10 includes a display 11, a communication unit 12, a control unit 13, and a storage unit 14. Further, the control unit 13 includes a position-information acquiring unit 13a, a movement-information acquiring unit 13b, a vehicle-outside-information acquiring unit 13c, a transmission processing unit 13d, and a reception processing unit 13e. The storage unit 14 stores therein position information 14a, movement information 14b, and vehicle-outside information 14c.

The display 11 is a display device such as a touch-panel display. The display 11 performs processing for displaying image data (generated by the portable terminal device 20, and) delivered from the reception processing unit 13e. When the image data includes an operation button, the display 11 further performs processing for accepting an operation by a passenger.

The communication unit 12 is a processing unit for performing radio communication with the portable terminal device 20. The communication unit 12 performs bidirectional data communication with the portable terminal device 20 according to a communication standard such as Bluetooth (registered trademark). Though, in the present embodiment, the communication between the in-vehicle device 10 and the portable terminal device 20 is performed as radio communication, the communication can be implemented as wired communication.

The control unit 13 is a processing unit that performs processing for transmitting information collected from a GPS sensor (such as GPS antenna and GPS positioning system) mounted on the vehicle and various types of running-state acquiring sensors to the portable terminal device 20, and further performs processing for displaying image data received from the portable terminal device 20 on the display 11.

The position-information acquiring unit 13a is a processing unit that performs processing for storing position information of the vehicle received from the GPS sensor (such as GPS antenna and GPS positioning system) in the storage unit 14 as the position information 14a. The position-information acquiring unit 13a updates the position information 14a as appropriate based on the output of the GPS sensor.

The movement-information acquiring unit 13b is a processing unit that performs processing for storing running information of the vehicle acquired from the running-state acquiring sensor (vehicle-speed sensor, rudder-angle sensor, yaw-rate sensor, and the like) in the storage unit 14 as the movement information 14b. The movement-information acquiring unit 13b updates the movement information 14b as appropriate based on the output of the running-state acquiring sensor.

The vehicle-outside-information acquiring unit 13c is a processing unit that performs processing for storing traffic information received by a traffic-information receiver in the storage unit 14 as the vehicle-outside information 14c. The vehicle-outside-information acquiring unit 13c updates the vehicle-outside information 14c as appropriate based on the output of the traffic-information receiver. The traffic-information receiver means a device, such as Vehicle Information and Communication System (VICS), which receives traffic information, and is a device which receives information from an electric-wave beacon or an optical beacon, FM multiplex broadcasting, and the like.

The transmission processing unit 13d is a processing unit that performs processing for reading out the position information 14a, the movement information 14b, and the vehicle-outside information 14c from the storage unit 14, and transmitting the read-out information to the portable terminal device 20 via the communication unit 12. Further, the reception processing unit 13e is a processing unit that performs processing for outputting the image data received from the portable terminal device 20 via the communication unit 12 to the display 11.

The storage unit 14 is a memory configured with a memory device such as a Hard Disk Drive (HDD) and a Random Access Memory (RAM), and stores therein the position information 14a, the movement information 14b, and the vehicle-outside information 14c.

A configuration of the portable terminal device 20 is explained next with reference to FIG. 3. As illustrated in FIG. 3, the portable terminal device 20 includes an antenna 21, a communication unit 22, a control unit 23, and a storage unit 24. Further, the control unit 23 includes a setting unit 23a, a scale-size determining unit 23b, a map-information acquiring unit 23c, an actual-location calculating unit 23d, an image-data generating unit 23e, a transmission processing unit 23f, and a reception processing unit 23g. The storage unit 24 stores therein scale-size information 24a and received information 24b.

The received information 24b means the position information 14a, the movement information 14b, and the vehicle-outside information 14c received from the in-vehicle device 10. The portable terminal device 20 is configured to incorporate at least an application program dedicated to a portable telephone which includes a function for downloading map data from a provider.

The antenna 21 is an antenna which receives radio waves from a map center device, and is an antenna for communication as provided in a general portable telephone. Further, the communication unit 22 is a processing unit that performs radio communication with the in-vehicle device 10, and performs bidirectional data communication with the in-vehicle device 10 based on a communication standard such as Bluetooth (registered trademark). Though, in the present embodiment, the communication between the in-vehicle device 10 and the portable terminal device 20 is implemented as radio communication, the communication may be implemented as wired communication.

The control unit 23 is a processing unit that performs processing for calculating an actual location, acquiring map data, and generating image data by combining the map data and various types of information based on information received from the in-vehicle device 10, and for transmitting the generated image data to the in-vehicle device 10.

The setting unit 23a is a processing unit that performs processing for receiving a customizing instruction of a navigation function by a passenger via an input unit such as an operation button not shown, and storing the set information as scale-size information 24a in the storage unit 24. The scale-size determining unit 23b is a processing unit that performs processing for determining the scale size of map data to be requested to the map center device based on the movement information 14b and the scale-size information 24a in the storage unit 24.

Figure 4:
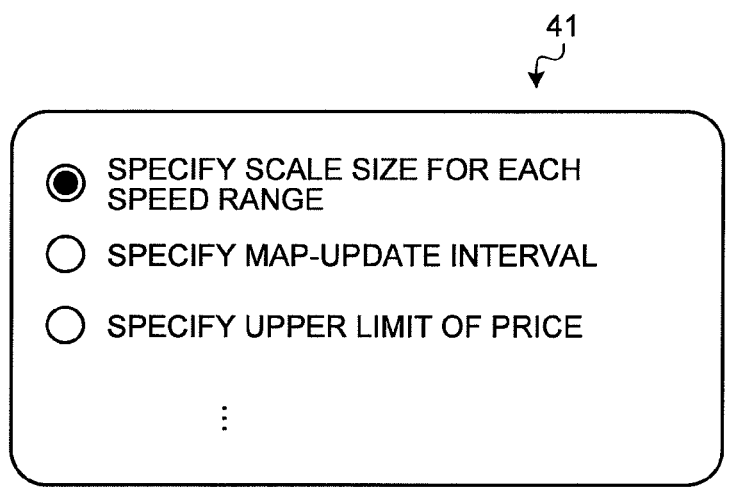
FIG. 4 is a diagram illustrating a variation in map-scale-size determination process.

Variations in map-scale-size determination process performed by the scale-size determining unit 23b is explained with reference to FIG. 4. FIG. 4 is a diagram illustrating the variations of the map-scale-size determination process. In FIG. 4, "41" represents an example of a selection screen displayed by the setting unit 23a on a display unit not shown, and "42" represents an example of data for allocating a predetermined scale size for each speed range.

As illustrated by "41" of FIG. 4, the variations of the map-scale-size determination process include, for example, "specify scale size for each speed range," "specify map-update interval," and "specify upper limit of price." When "specify scale size for each speed range" is selected, a predetermined scale size is specified for each speed range as illustrated by "42" of FIG. 4.

The passenger can set both of the speed range and the scale size, or one of the speed range and the scale size. The scale-size determining unit 23b determines in which speed range illustrated in "42" of FIG. 4 the vehicle speed included in the movement information 14b is covered, and determines a corresponding scale size as the map scale size.

If the scale size specified by the passenger is used, and the speed of map updating obviously cannot keep up with the vehicle speed because of the high-speed running of the vehicle, for example, the scale-size determining unit 23b changes the scale size as appropriate. Alternatively, restriction may be imposed on the specification by the passenger to prevent inappropriate specification.

When "specify map-update interval" is selected, the scale-size determining unit 23b determines an appropriate scale size for the map based on the update interval (e.g., 30 seconds) specified by the passenger and the vehicle speed included in the movement information 14b. Further, if the specified update interval does not fall within a predetermined range, the scale-size determining unit 23b may give alarm to the passenger. Alternatively, the scale-size determining unit 23b may prohibit the passenger from selecting an update interval outside the predetermined range.

Further, the scale-size determining unit 23b may determine whether the vehicle is running on an open road or a highway based on previously-set route-guide information to calculate an estimated speed, and determine the scale size of the map based on the calculated, estimated speed and the update interval specified by the passenger. Still further, the scale-size determining unit 23b may reduce the denominator of the scale size in particular, with regard to the scale size of the map of a surrounding of the destination registered in the previously-set route-guide information, branching point of the road, and the like (in other words, the scale-size determining unit 23b may switch from a wide-area map to a detailed map).

When "specify upper limit of price" is selected, the scale-size determining unit 23b calculates an update interval based on an upper limit of price specified by the passenger for acquiring map data, and determines an appropriate scale size of the map based on the calculated update interval and the vehicle speed included in the movement information 14b. For example, the scale-size determining unit 23b calculates how many pieces of map data can be acquired based on the upper-limit price and the price of one updating of the map data, and determines an appropriate scale size of the map based on the distance to the destination and the vehicle speed included in the movement information 14b.

Returning to FIG. 3, the map-information acquiring unit 23c is explained. The map-information acquiring unit 23c is a processing unit which performs processing for making a request to a map center device for map data of the scale size determined by the scale-size determining unit 23b, and delivering the received map data to the image-data generating unit 23e. For example, the map-information acquiring unit 23c makes request for map data and receives map data by browsing the web page of the map center device.

The actual-location calculating unit 23d is a processing unit which performs processing for calculating the actual location of the vehicle based on the position information 14a and the movement information 14b, and delivering the calculated actual location to the image-data generating unit 23e. Specifically, when the position information 14a is not updated (for example, when the vehicle is running in a tunnel), the actual-location calculating unit 23d complements the position information 14a using the vehicle speed, turn angular velocity, and the like included in the movement information 14b, and calculates the actual location of the vehicle.

The image-data generating unit 23e is a processing unit which performs processing for combining an own-vehicle-location icon corresponding to the actual location calculated by the actual-location calculating unit 23d and the map data sent from the map-information acquiring unit 23c, and delivering the combined image data to the transmission processing unit 23f. Further, the image-data generating unit 23e further performs processing for combining the vehicle-outside information 14c including traffic information and the like in the form of text data with the map data.

Here, an example of image data generated by the image-data generating unit 23e is explained with reference to FIG. 5. FIG. 5 is a diagram of an example of the image data. A section indicated by "51" in FIG. 5 includes map, operation buttons (51a and 51b), an own-vehicle-location icon 51c, and a text display area 51d. The vehicle-outside information 14c mentioned earlier is displayed in the text display area 51d. The passenger can select whether to display the vehicle-outside information 14c or not. When the vehicle-outside information 14c is information concerning an emergency, the vehicle-outside information 14c may be displayed regardless of the setting by the passenger.

The operation buttons (51a and 51b) are buttons (soft switches) for screen manipulation and are combined with the map data by the image-data generating unit 23e. The operation buttons are used for restricting the screen manipulation according to the vehicle speed included in the movement information 14b. For example, the number of operations can be limited in stepwise manner in view of safety according to the number of engine revolutions, or state of braking operation, other than vehicle speed. Further, the manipulation of the screen itself may be prohibited when, for example, it is determined based on the frequency of braking, ratio of the number of engine revolutions to speed, or the like, that the vehicle is running through continuous curves, e.g., through mountain road.

Further, as illustrated by "52" in FIG. 5, the image-data generating unit 23e further performs rotation process of a map according to the turning of the vehicle. For example, the image-data generating unit 23e calculates the moving direction of the vehicle based on the history of the position information 14a to perform the rotation process of the map. The image-data generating unit 23e may use the output of the running-state acquiring sensor (such as vehicle-speed sensor, rudder-angle sensor, yaw-rate sensor) included in the movement information 14b in calculating the moving direction of the vehicle. Further, as indicated by "53" in FIG. 5, when it is expected that an own-vehicle-location icon 52c moves to a position indicated by 53c in FIG. 5 in a predetermined time period, the image-data generating unit 23e receives new map data 53 from the map-information acquiring unit 23c to update the image data.

Returning to FIG. 3, the transmission processing unit 23f is explained. The transmission processing unit 23f is a processing unit which performs processing for transmitting the image data sent from the image-data generating unit 23e to the in-vehicle device 10 via the communication unit 22. The reception processing unit 23g is a processing unit which performs processing for storing, as the received information 24b, the position information 14a, the movement information 14b, and the vehicle-outside information 14c sent from the in-vehicle device 10 via the communication unit 22 in the storage unit 24.

The storage unit 24 is a memory including a memory device such as a hard disk drive (HDD) and random access memory (RAM). The storage unit 24 stores therein the scale-size information 24a (see FIG. 4) and the received information 24b.

In FIG. 3, the portable terminal device 20 is illustrated as communicating with the in-vehicle device 10 and the map center device. Further, if the portable terminal device 20 is configured with an application program dedicated for a portable telephone having a telephone function or a mailing function, the portable terminal device 20 can notify a help center of the state of the vehicle, such as a fault, by telephone or mail. In this case, the portable terminal device 20 would receive fault information from the in-vehicle device 10 and notify a help center device installed in the help center of the received fault information using the telephone function or the mailing function.

Process procedure in the portable terminal device 20 is explained with reference to FIG. 6. FIG. 6 is a flowchart illustrating a process flow of the portable terminal device 20. As illustrated in FIG. 6, the portable terminal device 20 establishes a physical connection with the in-vehicle device 10 (step s101). Subsequently, the portable terminal device 20 starts up an application program (step S102) to establish a logical connection with the in-vehicle device 10 (step S103). In step S103, the portable terminal device 20 receives notification from the in-vehicle device 10 concerning initial information such as presence/absence of various types of running-state acquiring sensors, screen size of the display 11, and the like. The portable terminal device 20 performs data communication with the in-vehicle device 10 based on the received initial information.

On receiving the position information 14a and the movement information 14b from the in-vehicle device 10 (step S104), the portable terminal device 20 performs a position correction to correct the position information 14a using the movement information 14b (step S105), and 1 calculates the position of the vehicle based on the result of position correction (step S106).

Then, it is determines whether the position of the vehicle is out of the map range or not (step S107). When the position of the vehicle is determined to be out of the map range (Yes in step S107), the scale-size determining unit 23b determines the scale size of the map (step S108). Using the determined scale size of the map, the map-information acquiring unit 23c acquires the map data from the map center device in the map center (step S109). When the condition for determination is not met in step S107 (No in step S107), the process goes to step S110 skipping the procedures in steps S108 and S109.

Subsequently, the image-data generating unit 23e combines the position of the vehicle with the map data (step S110). The transmission processing unit 23f transmits the image data generated by the image-data generating unit 23e to the in-vehicle device 10 (step S111). Thereafter, the portable terminal device 20 repeats the process from step S104. On the other hand, the in-vehicle device 10 which receives the image data from the portable terminal device 20 displays the received image data on the display 11.

As illustrated above, according to the embodiment, the navigation system is configured such that: the in-vehicle device collects the position information and the movement information of the vehicle and provides the collected information to the portable terminal device, and displays the image data sent from the portable terminal device; and on the other hand, the portable terminal device, based on the position information and the movement information sent from the in-vehicle device, acquires map information from the map center device, calculates the actual location of the vehicle based on the position information and the movement information sent from the in-vehicle device, and generates the image data in which the calculated actual location is superposed on the acquired map information. Thus, the in-vehicle-device side only performs provision of position information and the like, and display of the navigation screen, whereas the portable-terminal-device side performs acquisition of map data, calculation of actual location, and generation of navigation screen. Hence, the duplication of resources can be prevented and highly accurate navigation can be realized.

As illustrated above, the navigation system, the portable terminal device, and the in-vehicle device according to the present invention are useful for navigation of automobiles, and particularly suitable for configuring a low-cost navigation system by preventing resource duplication.

The invention claimed is:

1. A navigation system for providing route information including an actual location of a vehicle, the navigation system comprising an in-vehicle device mounted on the vehicle and a portable terminal device carried by a passenger, the in-vehicle device including:
a vehicle-information providing unit that collects and provides position information and movement information of the vehicle to the portable terminal device, the portable terminal device including:
a setting unit that receives, from the passenger, a setting related to a scale size of map information to be acquired from a map center device, wherein the setting related to the scale size of the map information, inputted by the passenger, is a plurality of correspondences between scale sizes and speed ranges;
a scale-size determining unit that determines a scale size requested to the map center device based on the setting received by the setting unit and the movement information sent from the vehicle-information providing unit of the in-vehicle device;

a map-information acquiring unit that acquires map information whose scale size is determined by the scale-size determining unit from the map center device;

an actual-location calculating unit that calculates the actual location of the vehicle based on the position information and the movement information sent from the vehicle-information providing unit of the in-vehicle device; and an image-data generating unit that generates the image data in which the actual location calculated by the actual-location calculating unit is superposed on the map information acquired by the map-information acquiring unit, and sends the generated image data to the in-vehicle device, the in-vehicle device further including a display unit that displays the image data sent from the portable terminal device.

2. The navigation system according to claim 1, wherein the scale-size determining unit of the portable terminal device changes the scale size requested to the map center device from the scale size according to the setting, when a speed of update of the map information cannot keep up with vehicle speed included in the movement information.

3. The navigation system according to claim 1, wherein the scale-size determining unit of the portable terminal device determines the scale size of the map information so that an update interval of the map information is fixed.

4. The navigation system according to claim 1, wherein the scale-size determining unit of the portable terminal device determines the scale size of the map information so that information charge for the map information is equal to or smaller than a predetermined amount.

5. The navigation system according to claim 1 wherein the image-data generating unit of the portable terminal device rotates the image data based on a moving direction of the vehicle calculated based on a history of the position information sent from the vehicle-information providing unit of the in-vehicle device.

6. The navigation system according to claim 1, wherein the image-data generating unit of the portable terminal device superposes an operation unit for accepting an operation by the passenger on the image data, and sets operation restraint of the operation unit based on the movement information sent from the vehicle-information providing unit of the in-vehicle device.

7. The navigation system according to claim 1, wherein the vehicle-information providing unit of the in-vehicle device collects and provides traffic information received by the vehicle to the portable terminal device, and the image-data generating unit of the portable terminal device superposes the traffic information on the image data.

8. The navigation system according to claim 1, wherein the vehicle-information providing unit of the in-vehicle device collects and provides fault information of the vehicle to the portable terminal device, and the portable terminal device further includes a fault notifying unit that notifies a help center device of the fault information sent from the vehicle-information providing unit of the in-vehicle device.

9. A portable terminal device for providing route information including actual location of a vehicle in cooperation with an in-vehicle device mounted on the vehicle to collect position information and movement information of the vehicle, the portable terminal device comprising:

a non-transitory storage device that stores information therein; and a controller coupled to the storage device, wherein the controller executes a process comprising:

receiving, from a passenger of the vehicle, a setting related to a scale size of map information to be acquired from a map center device wherein the setting related to the scale size of the map information, inputted by the passenger, is a plurality of correspondences between scale sizes and speed ranges;

determining a scale size requested to the map center device based on the received setting and the movement information of the vehicle collected by the in-vehicle device;

acquiring map information whose scale size is determined at the determining operation from the map center device;

calculating an actual location of the vehicle based on the position information and the movement information collected by the in-vehicle device;

generating image data by superposing the actual location calculated in the calculating operation based on the map information acquired in the acquiring operation; and providing the generated image data to the in-vehicle device.

* * * * *